(12) United States Patent
Busse et al.

(10) Patent No.: US 11,967,868 B2
(45) Date of Patent: Apr. 23, 2024

(54) METHOD FOR THE PRODUCTION OF A HELICAL METAL BODY

(71) Applicant: Fraunhofer-Gesellschaft zur Förderung der angewandten Forschung e.V., Munich (DE)

(72) Inventors: Matthias Busse, Bremen (DE); Franz-Josef Wöstmann, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 363 days.

(21) Appl. No.: 17/310,651

(22) PCT Filed: Feb. 14, 2020

(86) PCT No.: PCT/EP2020/053969
§ 371 (c)(1),
(2) Date: Aug. 16, 2021

(87) PCT Pub. No.: WO2020/169485
PCT Pub. Date: Aug. 27, 2020

(65) Prior Publication Data
US 2022/0149706 A1 May 12, 2022

(30) Foreign Application Priority Data
Feb. 19, 2019 (DE) ................. 10 2019 202 236.7

(51) Int. Cl.
*H02K 15/04* (2006.01)
*H02K 3/12* (2006.01)
(52) U.S. Cl.
CPC .......... *H02K 15/0435* (2013.01); *H02K 3/12* (2013.01)

(58) Field of Classification Search
CPC ........................ H02K 3/12; H02K 15/0435
(Continued)

(56) References Cited

U.S. PATENT DOCUMENTS 1,769,455 A * 7/1930 Pickering ................. B22C 9/10
164/369
3,481,249 A 12/1969 Holloway
(Continued)

FOREIGN PATENT DOCUMENTS

DE 19637288 A1 10/1997
DE 102012011554 A1 12/2013
(Continued)

OTHER PUBLICATIONS

Sterzing et al., English Machine Translation of DE102012011554 (Year: 2012).*
(Continued)

*Primary Examiner* — Rashad H Johnson
(74) *Attorney, Agent, or Firm* — Schwegman Lundberg & Woessner, P.A.

(57) ABSTRACT

The invention relates to a method for producing a helical metal body (1, 1'), in particular made of aluminum or an aluminum alloy. A blank is first produced in a primary shaping process, a metal forming process, or in a removal process, in particular a machining process, and one or more recesses (100, 101, 201, 202, 203) are then introduced into the blank using a removal process, said recesses defining a circumferential coil, the adjacent windings thereof being mutually spaced, in particular electrically insulated from one another.

9 Claims, 2 Drawing Sheets

Figure 1:
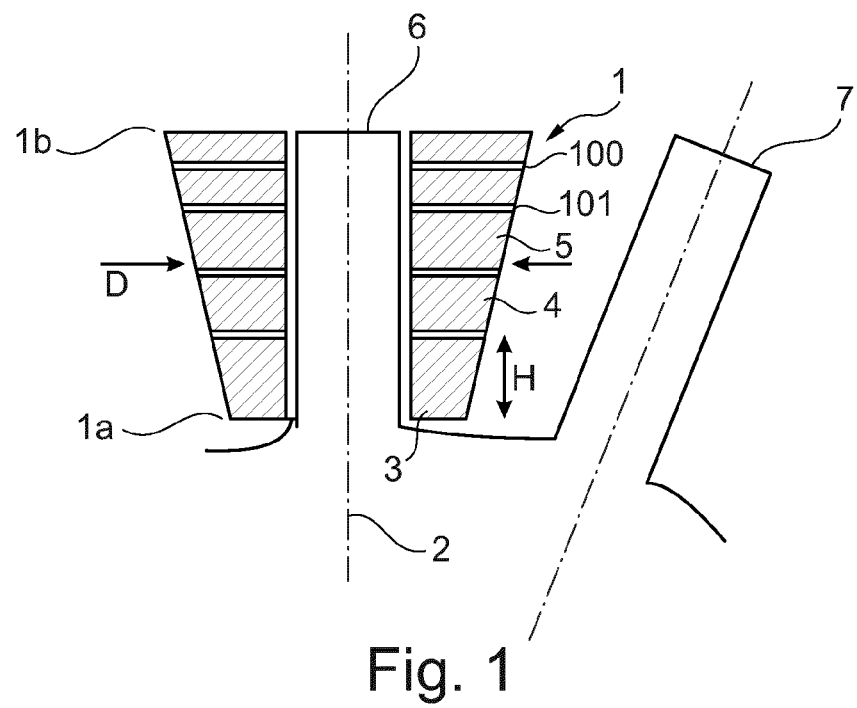

(58) Field of Classification Search
USPC .......................................................... 310/208
See application file for complete search history.

(56) References Cited

U.S. PATENT DOCUMENTS

| | | | | |
|---|---|---|---|---|
| 4,614,630 | A | * | 9/1986 | Pluim, Jr. ................ B29C 45/37 |
| | | | | 264/328.2 |
| 2012/0106586 | A1 | | 5/2012 | Villarreal-Saucedo et al. |
| 2012/0205482 | A1 | * | 8/2012 | Luttge .................... H01F 41/082 |
| | | | | 242/438 |
| 2012/0315107 | A1 | * | 12/2012 | Grubert .................. B65H 54/00 |
| | | | | 411/262 |
| 2015/0152908 | A1 | * | 6/2015 | Schwarzbich ............ B21F 3/02 |
| | | | | 470/14 |
| 2018/0166940 | A1 | * | 6/2018 | Nies ...................... H02K 15/095 |
| 2018/0323672 | A1 | * | 11/2018 | Juris ........................ H02K 3/18 |
| 2019/0333697 | A1 | * | 10/2019 | Werner ................ H01F 41/098 |
| 2020/0091801 | A1 | * | 3/2020 | Sadiku ............... H02K 15/0442 |
| 2020/0321814 | A1 | * | 10/2020 | Fatemi .................... H02K 1/148 |
| 2021/0035722 | A1 | * | 2/2021 | Herzog ..................... H01F 6/06 |
| 2021/0057151 | A1 | * | 2/2021 | Sasaki ...................... H02K 3/18 |
| 2021/0346944 | A1 | * | 11/2021 | Busse ...................... H02K 3/18 |

FOREIGN PATENT DOCUMENTS

| | | |
|---|---|---|
| EP | 0546453 A1 | 6/1993 |
| GB | 828291 A | 2/1960 |
| JP | 04171110 A | 6/1992 |
| JP | 11097270 A | 4/1999 |

OTHER PUBLICATIONS

"German Application Serial No. 10 2019 202 236.7, Office Action dated Mar. 3, 2020", w/ Concise Statement of Relevance, (dated Mar. 3, 2020), 12 pgs.

"International Application Serial No. PCT/EP2020/053969, International Search Report dated May 14, 2020", w/ English Translation, (dated May 14, 2020), 7 pgs.

"International Application Serial No. PCT/EP2020/053969, Written Opinion dated May 14, 2020", (dated May 14, 2020), 10 pgs.

"Chinese Application Serial No. 2202080015313.8, Office Action dated Dec. 1, 2023", w English Translation, (dated Dec. 1, 2023), 26 pgs.

"European Application Serial No. 20 705 936.1, European Search Report dated Feb. 15, 2024", (Feb. 15, 2024), 7 pgs.

* cited by examiner

METHOD FOR THE PRODUCTION OF A HELICAL METAL BODY

PRIORITY APPLICATIONS

This application is a U.S. National Stage Filing under 35 U.S.C. § 371 from International Application No. PCT/EP2020/053969, filed on Feb. 14, 2020, and published as WO2020/169485 on Aug. 27, 2020, which claims the benefit of priority to German Application No. 10 2019 202 236.7, filed on Feb. 19, 2019; the benefit of priority of each of which is hereby claimed herein, and which applications and publication are hereby incorporated herein by reference in their entireties.

Wound coils are used in electrical machines, in particular rotating machines, such as motors and generators. These normally surround poles/teeth of sheet stack. In standard design, the coils do not normally optimally fill the constructional space available. The result thereof is a non-optimised power- or torque density of the electrical machines relative to the weight or the constructional space of the coils.

Coils cast or reshaped in their end contour, relative to wound coils, increase the power or the torque or, during use of cast or reshaped aluminium coils, reduce the weight of the electrical machines. However, because of the complex geometry, they are expensive to produce.

The object therefore underlying the present invention is to simplify procedurally as extensively as possible the production of a complex geometry in the case of a helical metal body, in particular a coil.

The object is achieved by the present invention by means of a method having the features of patent claim 1. Patent claims 2 to 7 reveal possible embodiments of the method. Patent claims 8 to 13 relate to embodiments of a helical metal body.

Accordingly, the invention relates to a method for the production of a helical metal body, in particular made of aluminium or an aluminium alloy, or else made of copper or a copper alloy in which, firstly in a primary shaping method or in a reshaping method or in a subtractive, in particular machining method, a blank is produced and in which thereafter, by means of a subtractive method, one or more recesses are introduced into the blank, which recesses define a circumferential helix, the respectively mutually adjacent windings of which are at a spacing from each other, in particular are electrically insulated from each other.

By means of the mentioned production method, the contour of the helical metal body can be extensively premanufactured as a function of the purpose of use and the individually available space, and the regions of the metal body which, during casting or another primary shaping or reshaping method or a subtractive method, are difficult to shape and to integrate, are machined in a subsequent subtractive method. Also the actual helix structure can be produced firstly in the subtractive processing by introducing recesses, for example by producing a helical recess which, as circumferential helical slot, separates the individual windings of a produced coil from each other. The possible subtractive methods are dealt with also further on.

By means of a suitable method, very narrow slots can be introduced into the body so that the spacings between adjacent windings are very small and the use of the constructional space is correspondingly optimised.

One possible embodiment of the method relates to the fact that the subtractive method is implemented with a subtractive processing device, the metal body rotating about its longitudinal axis and being moved, at the same time, in a translatory manner relative to the processing device parallel to its longitudinal axis. This jointly includes both the translatory movement of the metal body and a possible translatory movement of the processing device.

A further possible embodiment of the method relates to the fact that the subtractive method is implemented with a subtractive processing device, the processing device rotating about the metal body whilst the metal body is moved, at the same time, in a translatory manner parallel to its longitudinal axis relative to the processing device.

This embodiment is intended also to include jointly the possibility that the relative movement of the metal body and of the processing device parallel to the longitudinal axis of the metal body is produced by a movement of the processing device. What matters is only the relative movement of the processing device and of the metal body.

By means of the two mentioned methods, a regular helix structure can be introduced into the metal body in a simple manner, possibly also with a variable pitch of the helix, as is explained subsequently.

A further possible embodiment of the method relates therefore to the fact that the ratio of the speed of rotation of the metal body or of the processing device relative to the translatory speed of movement during introduction of the recess/recesses in the metal body is variable as a function of the axial height of the processing location relative to the longitudinal axis. As a result, the pitch of the helix and the height of the individual windings of the helix is adjusted suitably in the direction parallel to the longitudinal axis of the helix and varied also along the longitudinal axis. For example, it is sensible, when the diameter of the coil and hence the thickness of the winding is large in the radial direction relative to the longitudinal axis of the helix, to adjust a lower height of the windings than when the diameter and the dimensioning of the windings are smaller in the radial direction.

A further possible embodiment of the method relates to the fact that the subtractive processing is effected by laser cutting, water jet cutting or machining processing.

The mentioned processing methods allow rapid processing with sufficient subtractive capacity.

A further possible embodiment of the method relates to the fact that the subtractive processing is effected, at the same time, at various places of the metal body, in particular, at the same time, from the inner and outer circumferential surface of the metal body.

For this purpose, a plurality of processing devices can be provided, which operate parallel to each other at various places of the metal body, for example adjacently, or also one processing device from the outer circumferential surface, whilst a different processing device performs the subtractive of the inner circumferential surface.

A further possible embodiment of the method relates to the fact that at the same time as the subtractive processing and/or by means of the design of the subtractive processing, a coating, in particular an electrically insulating coating, and/or a surface preparation for a subsequent coating of the metal body is effected.

By means of the subtractive, for example a specific surface roughness can be adjusted, which is suitable for further processing, for example coating.

In addition, the invention relates to a helical, with respect to its outer contour, in particular conical or pyramidal metal body, in particular made of copper or aluminium or an Al or Cu alloy, in which the helix extends about a longitudinal axis of the metal body and in which the outer contour of the metal body widens constantly, at least in portions, along the longitudinal axis from its first end in the direction towards its second end, the height of the individual windings of the helix, respectively measured parallel to the longitudinal axis of the helix, decreasing along the longitudinal axis of the metal body from the first end to the second end, in particular to such a degree that the amounts of the cross-sectional areas of the individual windings along the longitudinal axis are the same.

Because of the design of the variable height of the individual windings of the helix, great variability in the cross-sectional areas of the windings can be prevented. The height of the individual windings can also be chosen such that the cross-sectional area is essentially the same for all windings. Possibly, the last windings must be adapted or over-dimensioned at the winding heads. By means of the suitable distribution of the windings with constant cross-section, local heating effects of the winding during operation can be avoided or reduced.

In addition, the invention relates to a helical, with respect to its outer contour, in particular conical or pyramidal metal body, in particular made of copper or aluminium, or a Cu- or Al alloy, in which the helix extends about a longitudinal axis of the metal body and in which the outer contour of the metal body widens constantly, at least in portions, along the longitudinal axis from its first end in the direction towards its second end, at least on a part of the axial length of the metal body, the windings of the helix respectively having a radially external and also a radially internal delimitation surface and a first and second axial top surface and the axial top surfaces of the windings in the longitudinal section of the metal body including, with the longitudinal axis thereof, an angle $\alpha$ which is less than 90 degrees, in particular respectively two adjacent axial top surfaces of mutually adjacent windings being parallel to each other.

The concept underlying this embodiment is that, in the above-described production form of a helical body, in particular in the case of a conical outer contour of the blank, the extension direction of the recess or of the slot between the helix paths in the longitudinal section of the blank need not be situated perpendicular to the longitudinal axis of the helix. In the longitudinal section of the blank, the optimised (i.e. minimised with respect to the material subtractive) recess extends neither perpendicular to the longitudinal axis nor perpendicular to the outer contour, but rather therebetween, inclined in many cases slightly over 90 degrees relative to the longitudinal axis of the blank. This direction defines the shortest possible incision which extends from the outer contour/outer circumferential surface of the metal body to the inner circumferential surface of the metal body. As a result, when producing the helix, not only is the material to be removed minimised but also the remaining material is maximised, i.e. the available conductor cross-section is maximised. There are understood by the axial top surfaces of the individual windings, with a winding which is square in cross-section, the two surfaces of a winding which extend respectively from the radially, relative to the longitudinal axis of the helix/coil, outer side of the winding to the radially inner side thereof and thereby abut against the slots/intermediate spaces which extend between respectively adjacent windings of the helix.

Such an embodiment relates, in addition, to a helical metal body in which the angle $\alpha$ is greater than 90 degrees minus beta ($\alpha > (90-\beta)$), $\beta$ being the conical angle of the metal body. This definition leads to the fact that, in the longitudinal section of the helix, the slots between the windings do not extend perpendicular to the inner or outer contour/circumferential surface but rather in a direction which extends between a perpendicular on the inner circumferential surface and a perpendicular on the outer circumferential surface and hence are optimised with respect to the length of the slots since, in this direction, the spacing between the inner circumferential surface and the outer circumferential surface of a blank/metal body is minimised.

A further embodiment relates to a helical metal body which has a central, axial-symmetrical, cylindrical or conical recess.

In particular the above-mentioned advantages in an alignment of the slots/intermediate spaces between the windings, which is inclined relative to the perpendicular on the helix longitudinal axis, can be achieved with contours of the helix in which the wall thickness of the helix varies over the length thereof. This is the case in particular with a conical outer contour of the helix and a cylindrical central recess. However, the central recess can also be formed differently, according to the shape of the sheet stack to which the coil/helix is intended to be adapted, for example conically or also with a square cross-section, in order to achieve as large a conductor cross-section as possible in the helix.

A further optimised embodiment relates to a helical metal body in which the angle $\alpha$ is chosen such that, in the longitudinal section of the metal body, the length of the recess between the outer circumferential surface and the inner circumferential surface of the metal body is minimised.

A further embodiment relates to a helical metal body in which the height of the individual windings of the helix decreases along the longitudinal axis of the metal body from the first end to the second end, in particular to such a degree that the amounts of the cross-sectional areas of the individual windings along the longitudinal axis are the same. In conjunction with the diagonal position/inclination of the intermediate spaces between the windings, a further optimisation of the current bearing capacity of the helix can be produced in this way.

In the following, the invention is shown and explained subsequently with reference to Figures of a drawing. There are thereby shown FIG. 1 in a longitudinal section schematically, a helical metal body on a tooth of a sheet stack, FIG. 2 in a longitudinal section, a casting mould for a metal body which has the outer contour shown in FIG. 1, FIG. 3 a device for producing a continuous helical recess in the metal body in order produce a helix shape, and also FIG. 4 a helical metal body with intermediate spaces/slots between the individual windings which are inclined relative to the longitudinal axis of the helix by more than 90 degrees.

In FIG. 1, a helical metal body 1 in the form of a coil placed on a tooth 6 of a sheet stack is illustrated in a longitudinal section, the outer contour of which and outer circumferential surface of which, starting from a first end 1*a* along the longitudinal axis 2 up to a second end 1*b* of the helix extends conically.

The diameter D of the helical body, which is conical in this example, increases constantly from the first end 1*a* to the second end 1*b* of the body 1. In the helical metal body 1, approximately parallel slots 100, 101 are illustrated, which strictly speaking represent slot portions of a circumferential helical slot or a helical recess. In this respect, whenever slots or recesses are mentioned in this text, which delimit the windings of the helix, normally slot portions or parts/portions of a helical circumferential recess are meant. The slots 100, 101 define the circumferential helix with the individual windings 3, 4, 5.

Since the inner circumferential surface of the body 1 is cylindrical and the outer circumferential surface is conical, the thickness of the individual windings, measured respectively perpendicular to the longitudinal axis 2, increases from the first end 1*a* to the second end 1*b* of the helix. It is indicated in FIG. 1 that the height H of the individual windings correspondingly decreases from the first end 1*a* to the second end 1*b* so that ideally the cross-section of the individual windings is the same.

In addition to the tooth 6 of the sheet stack of an essentially cylindrical, rotating, electrical machine, also an adjacent tooth 7 is represented. It is evident from the angle between the axes of the teeth 6, 7 that the constructional space between them increases towards the outer circumference of the electrical machine so that the constructional space between the teeth 6, 7 can be used optimally by a conical coil.

Figure 2:
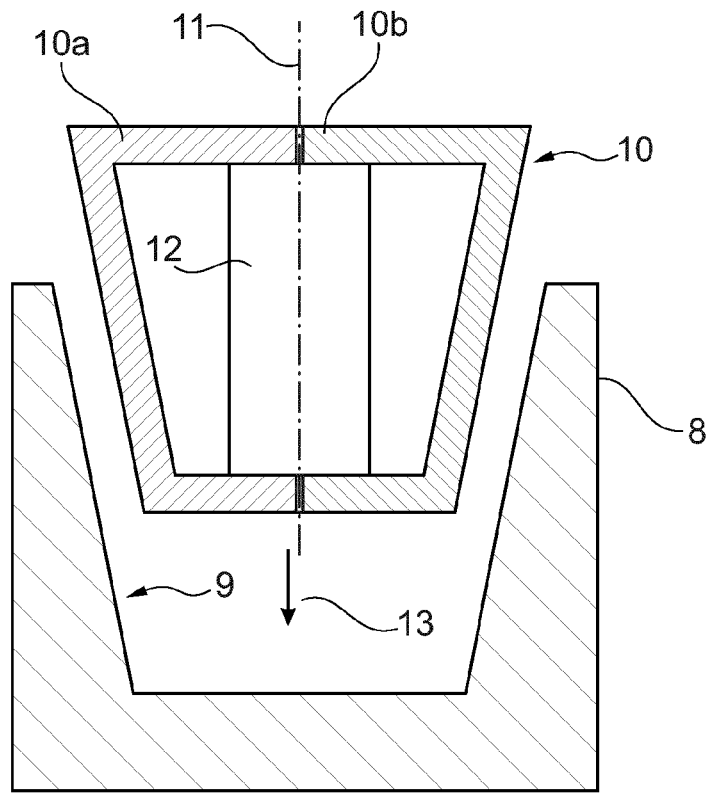

FIG. 2 shows a casting mould 8, 9, 10, 12 for producing a conical metal body, as is illustrated in FIG. 1 with respect to its outer contour, however without a helix structure and without a recess/a slot which defines the windings in a helix. Such a recess is intended, according to the invention, to be incorporated first in a subsequent manufacturing step in a blank, for example in the form of a solid metal body moulded in the casting mould. Even if the moulding represents an advantageous method for producing such a blank, also any other production method can be used for the production thereof, such as for example machining processing or an additive manufacturing method.

The casting mould comprises a matrix 10, preferably made of a ceramic or with a ceramic coating, and also a cylindrical mould core 12 which can likewise consist of a ceramic or be coated with a ceramic. The matrix consists of two parts 10*a*, 10*b* which are joined along the line 11. The matrix is used for casting in the direction of the arrow 13 in a support mould 8 made of steel. The outer cone of the matrix 10 fits into the conical recess 9 of the support mould made of steel so that the parts of the matrix are pressed together in the steel mould in a form-fit and independently of thermal forces and expansions. In the mould, the blank is cast in the matrix 10 for example from aluminium or copper.

Figure 3:
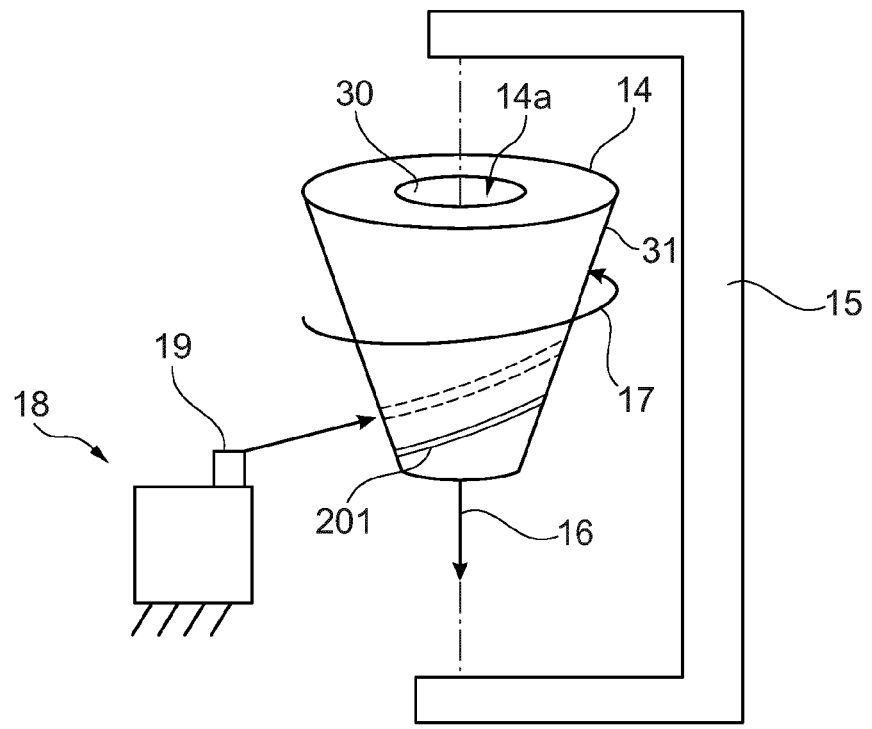

FIG. 3 shows a partially machined conical blank 14 in the form of a solid metal body made of copper or aluminium with a continuous, central, cylindrical recess 14*a*. A device is characterised with 15, which device is illustrated only schematically and holds the blank rotatably and actuatably about its longitudinal axis 2 in the direction of the arrow 17 and, at the same time, enables a translatory movement of the blank, which can be controlled as a function of the rotation, in the direction of the arrow 16.

In addition, a processing device 18 is illustrated, which, in this example, is disposed in a stationary manner but which can also be actuatable instead of the blank 14. The processing device can move linearly then in the direction counter to the arrow 16 and, at the same time, carry out a rotational movement about the blank.

The processing device 18 has a subtractive device 19 which produces a subtractive beam, for example a particle beam, a water jet or a laser beam which enables machining/cutting of a helical recess 201 in the blank, the recess reaching from the outer circumferential surface 31 to the inner circumferential surface 30, i.e. up to the cylindrical recess 14*a*. With simultaneous translation- and rotation movement, a helical recess is necessarily produced so that a helix structure remains on the blank.

With the beam control, it can also be effected at the same time that the edges of the indented recess, at least on the outer circumferential surface of the blank, are bevelled or rounded on one or both sides of the recess.

On the outer circumferential surface 31, often the one edge of the slot-shaped recess, in the case of a conical blank, is acute-angled, whilst the other edge is obtuse-angled. It can also be provided, for example, that only the acute edge is rounded or bevelled.

Figure 4:
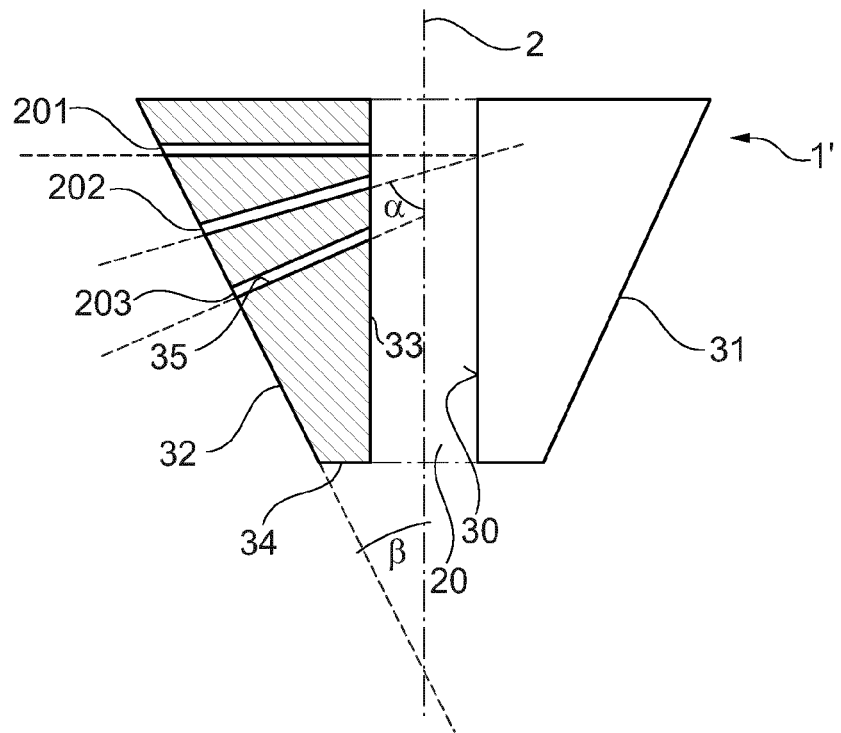

FIG. 4 shows a conical, helical metal body 1' with a conical outer contour and outer circumferential surface 31 and a cylindrical central recess 20 with a cylindrical, inner circumferential surface 30. The slots/slot portions 201, 202, 203, given by way of example, include various angles with the longitudinal axis 2 of the helix. The angle between the slot 202 and the longitudinal axis 2 is for example designated with α. The conical angle of the outer circumferential surface of the body 1' with the longitudinal axis is designated with β.

The slot 201 is orientated such that it is perpendicular to the longitudinal axis 2 with the slot plane thereof in the illustrated longitudinal section of the body 1' so that the angle α there is equal to 90 degrees.

The slot 203 is orientated such that its slot plane, in the illustrated longitudinal section of the body 1', is perpendicular to the outer circumferential surface of the body 1'. The angle α is significantly smaller than 90 degrees in this case. The slot 203 is delimited on its lower side in the Figure by the axial top surface 35 of the lowermost winding of the helix. Opposite this is the further axial top surface 34 of the same winding. The surface 32 is the radially outwardly situated delimitation surface and the surface 33 is the radially inwardly situated delimitation surface of the same winding.

The slot 202 is orientated such that its orientation is between an arrangement at right angles to the longitudinal axis 2 and an arrangement at right angles to the outer circumferential surface. This orientation leads to a minimised length of the slot in radial direction, hence to a minimisation of the processing for introducing the slot/slots and also to a maximisation of the remaining conductive material of the helix.

With the present invention, the production of a cast or reshaped coil with a potentially variable cross-section along the longitudinal axis is split procedurally into two partial steps: firstly, a simple solid preform/blank, optimised to the constructional space geometry, is produced for example with a variable wall thickness. Thereafter, the preform/blank is cut by a processing with superimposition of rotational and translatory movement ("peeling") or more generally by a subtractive processing, a recess, for example a slot, is introduced into the blank so that windings are produced, which windings can be variable over the length of the helix/coil with respect to the pitch height/winding height or the height in the longitudinal direction of the helix or also for example with respect to its thickness in the radial direction of the helix.

In particular, the following features thereby apply:
  a) The invention can be applied in the production of electrical coils, (mechanical) springs or spirals by helical subtractive of material on a preform/blank.
  b) The process of the helical subtractive ("peeling process") is produced by superimposition of a rotating relative movement with a translatory relative movement between a subtractive tool or subtractive beam and the preform.
  c) By control of the translatory movement as a function of the position along the longitudinal axis of the preform, a different height of the windings can thereby be achieved during peeling.

d) The cross-sectional surface of the resulting windings can therefore by kept constant over the height with variable wall thickness of the preform by control of the translatory movement.
e) The cutting in the above-mentioned peeling movement is effected by laser, electron beam, water jet or other suitable methods for cutting metal or other electrically conductive materials.
f) The cutting process can take place simultaneously in a plurality of planes by a plurality of parallel cuts which are controlled in their spacing, coordinating with the translatory movement. The cutting process can be implemented from the inside, from the inner circumferential surface of the metal body or from the outside thereof or, at the same time, from inside and outside.
g) The preform/blank has as block, before the peeling process, the geometry/outer contour and inner contour of the subsequent coil (or spiral or spring) taking into account the machining by cutting and the application by coating (e.g. insulation or protective coating).
h) The preform consists of electrically conductive material, for example made of Al or Cu, and can be produced by primary shaping, reshaping or by machining methods.
j) The shaping of an Al preform/blank can be effected, for example by pressure casting or strand pressing. What is crucial is the end contour-close geometry of the preform with respect to the subsequent coil. By means of the peeling process, the individual windings of the coil are produced from the preform.
k) The shaping of a Cu preform can be effected, for example in the low-pressure casting method, all further current Cu casting methods or by reshaping or machining methods.
l) During casting of Cu preforms, ceramic mould inserts in the form of permanent moulds can be used. As a result, the lifespan of the permanent moulds can be significantly increased. The preform advantageously comes in contact exclusively with ceramic surfaces of the moulds and mould inserts during casting.
m) By separating the shaping of the preform and the peeling process for producing the windings, the production of the preform is considerably simplified.
n) During the peeling process, either the preform can be rotated (rotation), or the beam sources or cutting tools are guided around the preform.
o) For the translatory movement, either the preform can be moved or the beam source or cutting tools are moved in a translatory manner relative to the preform.
p) The cutting by means of beam sources can be used to influence the cut surfaces in order, for example by suitable additives, to achieve a surface pre-treatment for the subsequent coating.
q) The peeling process can be extended by combination of the cutting process with introduction of additive material to form a simultaneous electrical insulation.

During cutting by means of a beam, a simultaneous rounding of the cut edges can be achieved by guiding the beam at the entrance and at the exit of the slots from the body, which can lead to optimisation of the subsequent coating process and improved insulation.

As special method, the peeling process and the entire method described here can be used, instead of with a metal cast body, also with a model body in the lost-foam casting method. In the lost-foam method, the production of the preform relates to peeling of the (e.g. EPS) model, e.g. by hot wire cutting or other cutting methods suitable for corresponding plastic materials. In the lost-foam method, the model produced in advance by peeling is cast and thus further processed to form the electrically conductive coil.

The advantage of the invention resides in the cost reduction and series capacity in the production of coils/helixs (spirals, springs) with variable geometry of the winding cross-section over the length of the coil. Relative to wound coils, the advantages of the improved geometric filling degree and the efficiency and further advantages following herefrom exist for an electrical machine.

With respect to production of Cu coils, the advantage exists of simplified shaping and longer lifespans of the tools. With respect to the production of Al coils, the advantage exists of cost reduction and simplification of the shaping tools or dispensing with cores or insert parts.

The production method according to the above-described invention permits, with simple means, the production also of relatively complexly formed helical metal bodies by dividing the method in two, in which the production of a blank is separated from the forming of the helix shape.

The invention claimed is:

1. A method for producing a helical metal body, the method comprising:
    producing a blank using a subtractive machining process; and
    introducing at least one recess into the blank using the subtractive machining process, wherein the at least one recess defines a circumferential helix, wherein respectively mutually adjacent windings of the circumferential helix are at least one of: spaced from each other, or are electrically insulated from each other, wherein the subtractive machining process is implemented with a subtractive processing device, wherein the subtractive machining process includes:
    rotating the helical metal body about its longitudinal axis; and
    moving the helical metal body during the rotating in a translatory manner relative to the subtractive processing device parallel to its longitudinal axis.

2. The method according to claim 1, wherein the subtractive machining process is implemented with a subtractive processing device, wherein the subtractive processing device rotates about the helical metal body as the metal body is moved in a translatory manner parallel to its longitudinal axis relative to the subtractive processing device.

3. The method according to claim 1, wherein a ratio of a speed of rotation of the helical metal body or a speed of rotation of the subtractive processing device relative to a translatory speed of movement during introduction of the at least one recess in the helical metal body is variable as a function of an axial height of a machining location relative to the longitudinal axis of the subtractive processing device.

4. The method according to claim 1, wherein the subtractive machining process includes at least one of: a laser cutting, a water jet cutting, or a machining processing.

5. The method according to claim 1, wherein the subtractive machining process is performed concurrently on an inner circumferential surface of the helical metal body and an outer circumferential surface of the helical metal body.

6. The method according to claim 1, wherein concurrently with the subtractive machining process at least one of a coating or a surface preparation for a subsequent coating is applied to a surface of the helical metal body.

7. The method according to claim 6, wherein the coating is an electrically insulating coating.

8. A helical metal body, comprising:
a metal body formed from at least one of copper or aluminum; and
wherein a outer contour of the metal body widens, at least in portions, along a longitudinal axis from a first end in a direction towards a second end , at least on a part of an axial length of the metal body, wherein one or more windings of the helix include a respective external delimitation surface, an internal delimitation surface, a first axial top surface, and a second axial top surface, wherein at least one of the first axial top surface or the second axial top surface of at least one winding of the one or more windings in a longitudinal section along the longitudinal axis of the metal body, include, with the longitudinal axis thereof, an angle $\alpha$ which is less than 90 degrees, and wherein the angle a is greater than 90 degrees—$\beta$, wherein $\beta$ is a conical angle of the metal body.

9. The helical metal body according to claim 8, wherein the angle $\alpha$ is chosen such that, in the longitudinal section along the longitudinal axis of the metal body , a length of a recess between an outer circumferential surface and an inner circumferential surface of the metal body is minimized.

* * * * *